(12) United States Patent  (10) Patent No.: US 9,282,091 B2
Ohkuma  (45) Date of Patent:  Mar. 8, 2016

(54) INFORMATION PROCESSING SYSTEM, INFORMATION PROCESSING DEVICE, AND AUTHENTICATION METHOD

(71) Applicant: Hideharu Ohkuma, Tokyo (JP)

(72) Inventor: Hideharu Ohkuma, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 243 days.

(21) Appl. No.: 14/164,319

(22) Filed: Jan. 27, 2014

(65) Prior Publication Data

US 2014/0223009 A1  Aug. 7, 2014

(30) Foreign Application Priority Data

Feb. 6, 2013  (JP) .................................. 2013-021266

(51) Int. Cl.
*G06F 15/173* (2006.01)
*H04L 29/06* (2006.01)

(52) U.S. Cl.
CPC .................................. *H04L 63/0815* (2013.01)

(58) Field of Classification Search
CPC ......... G06F 21/10; G06F 17/24; G06Q 10/08; G06Q 30/00; G06Q 30/02
See application file for complete search history.

(56) References Cited

U.S. PATENT DOCUMENTS

| 2004/0088543 | A1* | 5/2004 | Garg | H04L 63/0815 713/157 |
|---|---|---|---|---|
| 2004/0139319 | A1* | 7/2004 | Favazza | H04L 63/0807 713/168 |
| 2005/0039054 | A1* | 2/2005 | Satoh | H04L 63/0815 726/4 |
| 2005/0288945 | A1* | 12/2005 | Melamed | G06F 17/3089 705/1.1 |
| 2006/0010251 | A1* | 1/2006 | Mrsic-Flogel | H04L 12/1822 709/245 |
| 2006/0021018 | A1* | 1/2006 | Hinton | H04L 63/06 726/10 |
| 2008/0120129 | A1* | 5/2008 | Seubert | G06Q 10/06 705/35 |
| 2009/0234903 | A1* | 9/2009 | Lomelli | G06F 9/5055 709/201 |
| 2009/0249439 | A1* | 10/2009 | Olden | H04L 63/0815 726/1 |
| 2012/0284014 | A1* | 11/2012 | Zivkovic | G06F 17/289 704/3 |

FOREIGN PATENT DOCUMENTS

| JP | 2006-031714 | 2/2006 |
| JP | 2012-226700 | 11/2012 |
| WO | WO 2012/144164 A1 | 10/2012 |

* cited by examiner

*Primary Examiner* — Peling Shaw
(74) *Attorney, Agent, or Firm* — IPUSA, PLLC

(57) ABSTRACT

An information processing system includes a common service providing unit configured to manage a user with organization identification information, user identification information, and unique identification information, and to provide a common service; and an application service providing unit configured to manage a user with user identification information, and to provide an application service by using the common service. The application service providing unit includes a receiving unit configured to request the common service providing unit to perform authentication on user identification information and organization identification information received from an external device, and receive, from the common service providing unit, the unique identification information associated with the user identification information and the organization identification information received from the external device, and a requesting unit configured to identify a user with the unique identification information and request the common service providing unit to provide the common service.

8 Claims, 11 Drawing Sheets

FIG.5

| ORGANIZATION ID |
| --- |
| ORGANIZATION NAME |
| DISPLAY LANGUAGE |
| TIME ZONE |
| STATE |
| COUNTRY |

FIG.6

| ORGANIZATION ID |
| --- |
| USER ID |
| PASSWORD |
| USER NAME |
| DISPLAY LANGUAGE |
| TIME ZONE |
| STATE |
| UUID |

FIG.7

| ORGANIZATION ID |
| --- |
| SERVICE |

FIG.8

| ORGANIZATION ID |
| --- |
| DEVICE AUTHENTICATION INFORMATION |
| BUSINESS OFFICE INFORMATION |
| CAPABILITY |

FIG.9

| USER ID |
| --- |
| ROLE |

FIG.15

| uuid | ORGANIZATION ID | SERVICE | ROLE |
|---|---|---|---|
| dcasdfacb6-345s-1p0s-b1f3-7e3asda8as3 | AAA | SCAN | ADMINISTRATOR |
| 2bi2aafc-57dc-422b-b5b8-978906b567c0 | BBB | [SCAN, PRINT] | GENERAL USER |
| ... | ... | ... | ... |

FIG.16

| SERVICE THAT CAN BE USED | COMMON | | | | SCAN SERVICE (scancx) | PRINT SERVICE (frexrelease) | |
|---|---|---|---|---|---|---|---|
| ROLE | LIST OF APPLICATIONS | SERVICE MANAGEMENT | ACCOUNT INFORMATION | USER MANAGEMENT | SCAN SETTING SCREEN | JOB REGISTRATION SCREEN | PRINT SETTING SCREEN |
| user | ○ | | ○ | | | ○ | |
| poweruser | ○ | ○ | ○ | ○ | ○ | ○ | ○ |

INFORMATION PROCESSING SYSTEM, INFORMATION PROCESSING DEVICE, AND AUTHENTICATION METHOD

BACKGROUND OF THE INVENTION

1. Field of the Invention

The present invention relates to an information processing system, an information processing device, and an authentication method.

2. Description of the Related Art

In recent years, cloud computing has been garnering attention, which is a form of providing services from a server to a client. In cloud computing, many computing resources are used for executing data processing, and processing a request from a client. There are many vendors that provide various services by implementing a web service in a cloud computing environment for realizing cloud computing as described above (see, for example, Patent Document 1).

The user may need to perform multiple authentication operations in order to use various services provided by cloud computing. Note that Single Sign-On (SSO) is known as a technology for reducing the load inflicted on the user when performing authentication. By Single Sign-On, after the user completes a sign-on operation, i.e., after the user is authenticated, the user does not need to execute another authentication operation (see, for example, Patent Document 2).

In information processing systems and information processing devices for providing services, there are cases where the contents of user information used for user management are different. However, in the conventional method of cooperatively executing the processes by combining the information processing systems and information processing devices, inconveniences may arise in user management unless the contents of user information used for user management are redesigned so as to match each other.

Patent Document 1: Japanese Laid-Open Patent Publication No. 2012-226700

Patent Document 2: Japanese Laid-Open Patent Publication No. 2006-31714

SUMMARY OF THE INVENTION

The present invention provides an information processing system, an information processing device, and an authentication method, in which one or more of the above-described disadvantages are eliminated.

According to an aspect of the present invention, there is provided an information processing system including one or more information processing devices, the information processing system including a common service providing unit configured to manage a user with organization identification information, user identification information, and unique identification information, and to provide a common service; and an application service providing unit configured to manage a user with user identification information, and to provide an application service by using the common service provided by the common service providing unit, wherein the application service providing unit includes a receiving unit configured to request the common service providing unit to perform authentication on user identification information and organization identification information received from an external device, and receive, from the common service providing unit, the unique identification information associated with the user identification information and the organization identification information received from the external device, and a requesting unit configured to identify a user with the unique identification information, and request the common service providing unit to provide the common service.

According to an aspect of the present invention, there is provided an information processing device including a common service providing unit configured to manage a user with organization identification information, user identification information, and unique identification information, and to provide a common service; and an application service providing unit configured to manage a user with user identification information, and to provide an application service by using the common service provided by the common service providing unit, wherein the application service providing unit includes a receiving unit configured to request the common service providing unit to perform authentication on user identification information and organization identification information received from an external device, and receive, from the common service providing unit, the unique identification information associated with the user identification information and the organization identification information received from the external device, and a requesting unit configured to identify a user with the unique identification information and request the common service providing unit to provide the common service.

According to an aspect of the present invention, there is provided an authentication method executed by an information processing system including one or more information processing devices, wherein the information processing system includes a common service providing unit configured to manage a user with organization identification information, user identification information, and unique identification information, and to provide a common service, and an application service providing unit configured to manage a user with user identification information, and to provide an application service by using the common service provided by the common service providing unit, the authentication method including requesting, by the application service providing unit, the common service providing unit to perform authentication on user identification information and organization identification information received from an external device; receiving, by the application service providing unit from the common service providing unit, the unique identification information associated with the user identification information and the organization identification information received from the external device; and requesting, by the application service providing unit, the common service providing unit to provide the common service by identifying a user with the unique identification information.

BRIEF DESCRIPTION OF THE DRAWINGS

Other objects, features and advantages of the present invention will become more apparent from the following detailed description when read in conjunction with the accompanying drawings, in which:

FIG. 5 is a configuration diagram of an example of organization information;

FIG. 6 is a configuration diagram of an example of user information;

FIG. 7 is a configuration diagram of an example of license information;

FIG. 8 is a configuration diagram of an example of device information;

FIG. 9 is a configuration diagram of an example of authority information;

FIG. 12 is a sequence diagram (part 1 of 2) of an example of processing procedures for logging in;

FIG. 14 is a sequence diagram (part 2 of 2) of an example of processing procedures for logging in;

FIG. 15 is a configuration diagram of an example of cache data; and

FIG. 16 is a configuration diagram of an example of a portal table.

DETAILED DESCRIPTION OF THE PREFERRED EMBODIMENTS

A description is given, with reference to the accompanying drawings, of embodiments of the present invention.

First Embodiment

System Configuration

Figure 1:
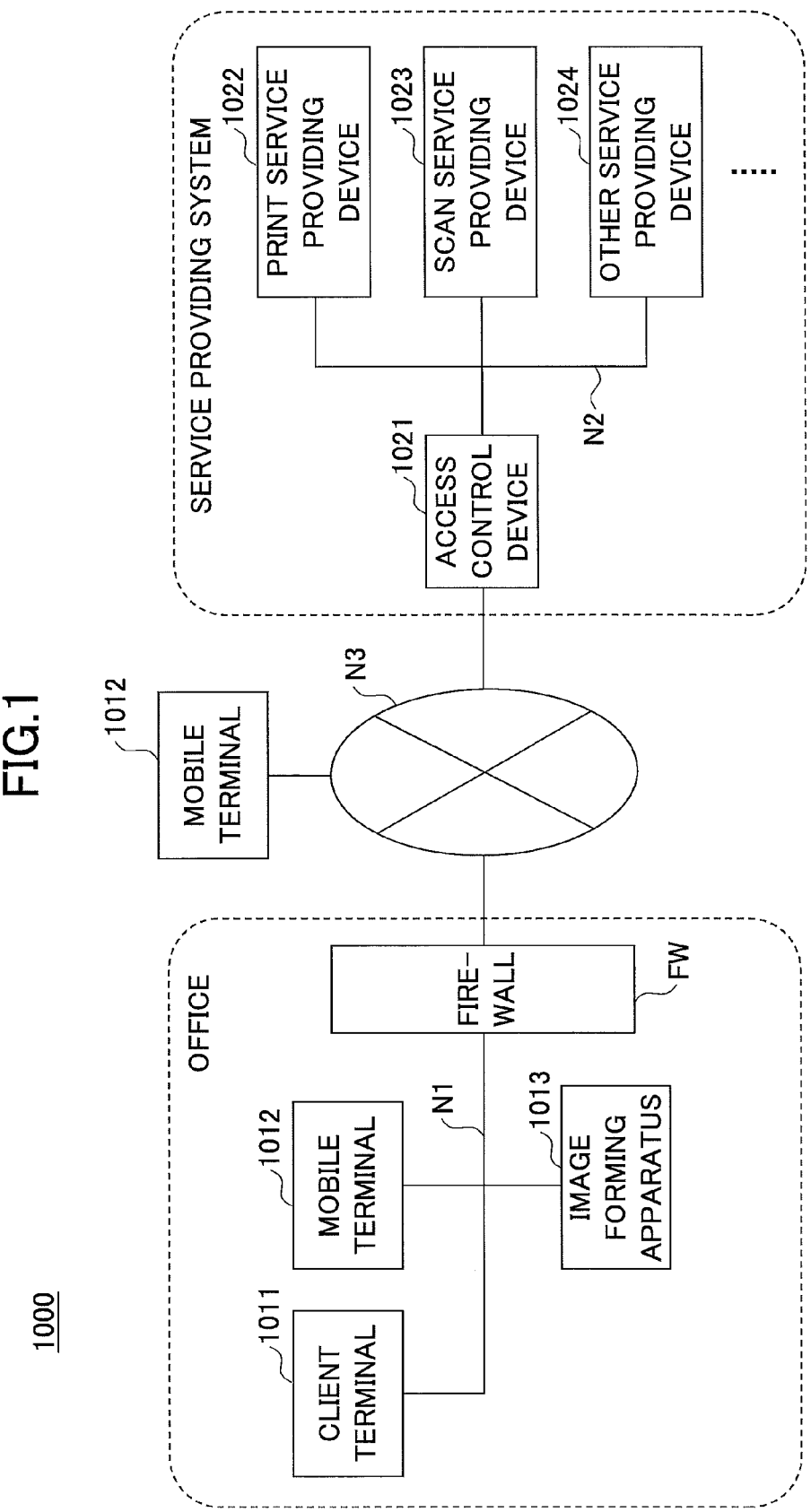
FIG. 1 is a configuration diagram of an example of an information processing system according to a first embodiment.

FIG. 1 is a configuration diagram of an example of an information processing system according to a first embodiment. An information processing system 1000 illustrated in FIG. 1 includes, for example, a network N1 such as a network in an office, a network N2 of a service providing system represented by a cloud service, and a network N3 such as the Internet.

The network N1 is a private network behind a firewall FW. The firewall FW is installed at the contact point between the network N1 and the network N3, and detects and blocks unauthorized accesses. To the network N1, a client terminal 1011, a mobile terminal 1012, and an image forming apparatus 1013 such as a multifunction peripheral, are connected.

The client terminal 1011 is an example of a terminal device. The client terminal 1011 is realized by an information processing device in which a typical OS is installed. The client terminal 1011 includes a unit for performing radio communication or a unit for performing cable communication. The client terminal 1011 is a terminal that can be operated by a user, such as a tablet PC and a notebook PC.

The mobile terminal 1012 is an example of a terminal device. The mobile terminal 1012 includes a unit for performing radio communication or a unit for performing cable communication. The mobile terminal 1012 is a terminal that is portable for a user, such as a smartphone, a mobile phone, a tablet PC, and a notebook PC.

The image forming apparatus 1013 is a device having an image forming function, such as a multifunction peripheral. The image forming apparatus 1013 includes a unit for performing radio communication or a unit for performing cable communication. The image forming apparatus 1013 is a device for performing processes relevant to image formation, such as a multifunction peripheral, a copier, a scanner, a printer, a laser printer, a projector, and an electronic blackboard. FIG. 1 illustrates an example including one of each of the client terminal 1011, the mobile terminal 1012, and the image forming apparatus 1013; however, there may be a plurality of each of these devices.

The network N2 is connected to the network N3 by an access control device 1021. The security of the network N2 is protected by the access control device 1021. To the network N2, a print service providing device 1022, a scan service providing device 1023, and another service providing device 1024 are connected.

In the information processing system 1000 of FIG. 1, the access control device 1021, the print service providing device 1022, the scan service providing device 1023, and the other service providing device 1024 realize the service providing system. The print service providing device 1022, the scan service providing device 1023, and the other service providing device 1024 provide a print service, a scan service, and other services.

The access control device 1021 controls the operation of logging into a print service provided by the print service providing device 1022 and a scan service provided by the scan service providing device 1023.

The access control device 1021, the print service providing device 1022, the scan service providing device 1023, and the other service providing device 1024 are realized by one or more information processing devices.

The access control device 1021, the print service providing device 1022, the scan service providing device 1023, and the other service providing device 1024 may be realized by being integrated in a single information processing device, or may be realized by being distributed across a plurality of information processing devices.

Part of the services on the network N2 side may be outside the network N2. The mobile terminal 1012 may be outside the network N1 that is a network inside the office. In the example of the information processing system 1000 of FIG. 1, the mobile terminal 1012 is in the network N1 and in the network N3.

Figure 2:
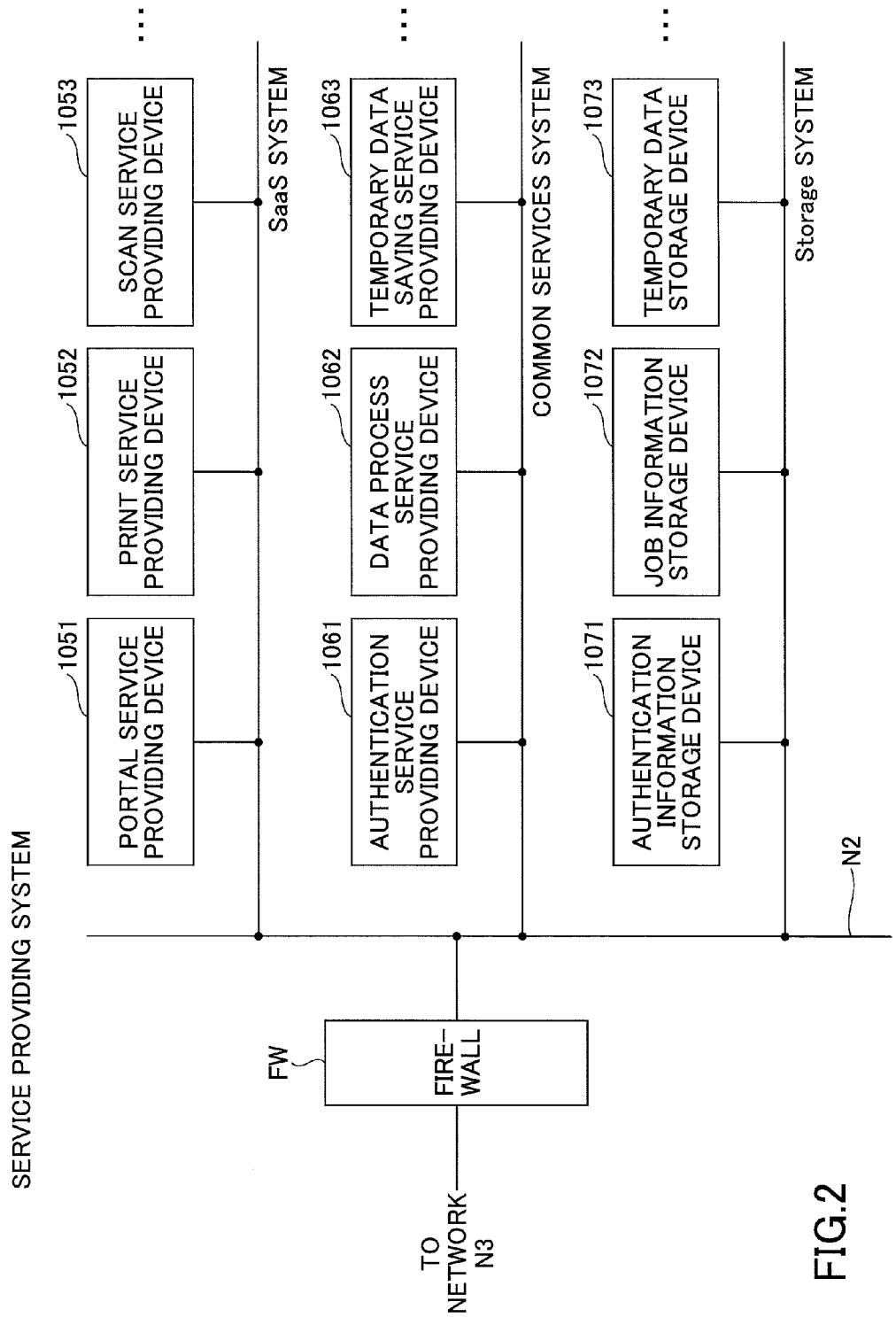
FIG. 2 is a configuration diagram of another example of the service providing system.

The configuration of the service providing system of FIG. 1 is one example; the service providing system may be realized by the configuration illustrated in FIG. 2. FIG. 2 is a configuration diagram of another example of the service providing system. In the service providing system of FIG. 2, the network N2 is connected to the network N3 by a firewall FW.

In the network N2, service providing devices of a SaaS (Software as a Service) system, service providing devices of a common service (Network Service Platform) system, and storage devices of the storage system are connected. The service providing device of a common service system provides a service that can be commonly used by the service providing devices of the SaaS system.

The service providing devices of the SaaS system include service providing devices according to the service to be provided, such as a portal service providing device 1051, a print service providing device 1052, and a scan service providing device 1053. Furthermore, the service providing devices of the common service system include service providing devices according to a common service to be provided, such as an authentication service providing device 1061, a data process service providing device 1062, and a temporary data saving service providing device 1063. The storage devices of the storage system include storage devices according to the information (data) to be stored, such as an authentication information storage device 1071, a job information storage device 1072, and a temporary data storage device 1073.

In the service providing system of FIG. 2, security is protected by authentication services provided by, for example, the firewall FW and the authentication service providing device 1061. Note that the configuration of the service providing system of FIG. 2 is also one example, and the service providing system may have other configurations.

Hardware Configuration

Figure 3:
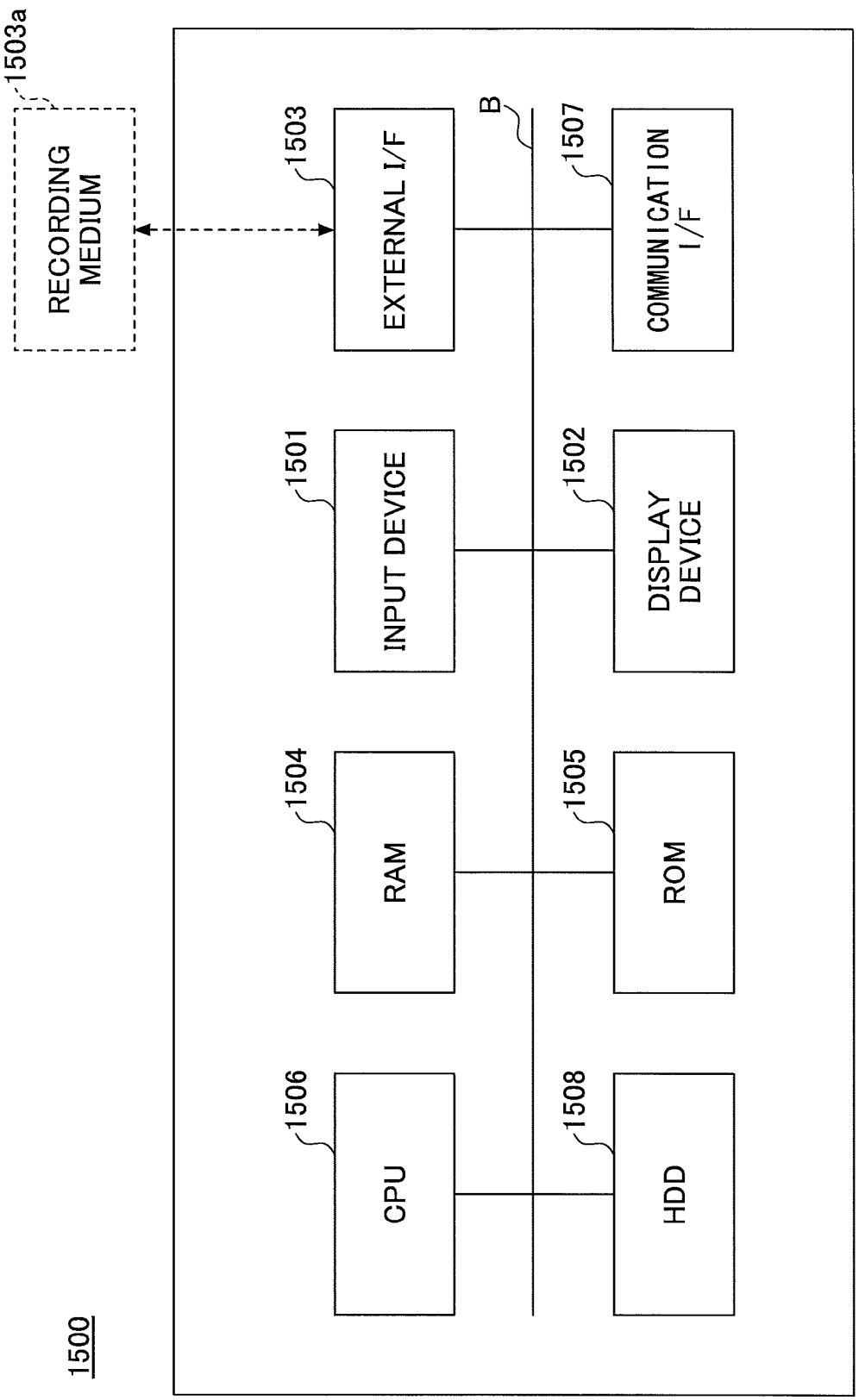
FIG. 3 is a hardware configuration diagram of an example of a computer system.

The client terminal 1011, the mobile terminal 1012, the access control device 1021, the print service providing device 1022, the scan service providing device 1023, and the other service providing device 1024 are realized by, for example, computer system having a hardware configuration as illustrated in FIG. 3.

The service providing devices of the SaaS system, the service providing devices of the common service system, and the storage devices of the storage system illustrated in FIG. 2 may also be realized by, for example, a computer system having a hardware configuration as illustrated in FIG. 3.

FIG. 3 is a hardware configuration diagram of an example of a computer system. A computer system 1500 illustrated in FIG. 3 includes an input device 1501, a display device 1502, an external I/F 1503, a RAM (Random Access Memory) 1504, a ROM (Read-Only Memory) 1505, a CPU (Central Processing Unit) 1506, a communication I/F 1507, and a HDD (Hard Disk Drive) 1508, which are interconnected by a bus B.

The input device 1501 includes a keyboard, a mouse, and a touch panel, which are used by the user for inputting operation signals. The display device 1502 includes a display, etc., and displays processing results obtained by the computer system 1500.

The communication I/F 1507 is an interface for connecting the computer system 1500 to the networks N1 through N3. Accordingly, the computer system 1500 can perform data communication via the communication I/F 1507.

The HDD 1508 is a nonvolatile storage device storing programs and data. Examples of the stored programs and data are an OS (Operating System) which is the basic software for controlling the entire computer system 1500, and application software for providing various functions in the OS.

The HDD 1508 manages the stored programs and data by a predetermined file system and/or a DB (database). The external I/F 1503 is an interface between the computer system 1500 and an external device. An example of the external device is a recording medium 1503*a*. Accordingly, the computer system 1500 can read data from and/or write data in the recording medium 1503*a* via the external I/F 1503. Examples of the recording medium 1503*a* are a flexible disk, a CD (Compact Disk), a DVD (Digital Versatile Disk), an SD memory card, and a USB memory (Universal Serial Bus memory).

The ROM 1505 is a nonvolatile semiconductor memory (storage device) that can hold programs and data even after the power is turned off. The ROM 1505 stores programs and data such as BIOS (Basic Input/Output System) that is executed when the computer system 1500 is activated, OS settings, and network settings. The RAM 1504 is a volatile semiconductor memory (storage device) for temporarily storing programs and data The CPU 1506 is a processor for loading the programs and data from storage devices such as the ROM 1505 and the HDD 1508 into the RAM 1504, and executing processes, control the entire computer system 1500 and realize functions.

The client terminal 1011, the mobile terminal 1012, the access control device 1021, the print service providing device 1022, the scan service providing device 1023, and the other service providing device 1024 can realize various processes as described below, by the hardware configuration of the computer system 1500. Furthermore, the service providing device of the SaaS system, the service providing device of the common service system, and the storage device of the storage system can also can realize various processes as described below, by the hardware configuration of the computer system 1500. Note that descriptions of hardware configurations of the image forming apparatus 1013 and the firewall FW illustrated in FIG. 1 are omitted.

Software Configuration

Service Providing System

Figure 4:
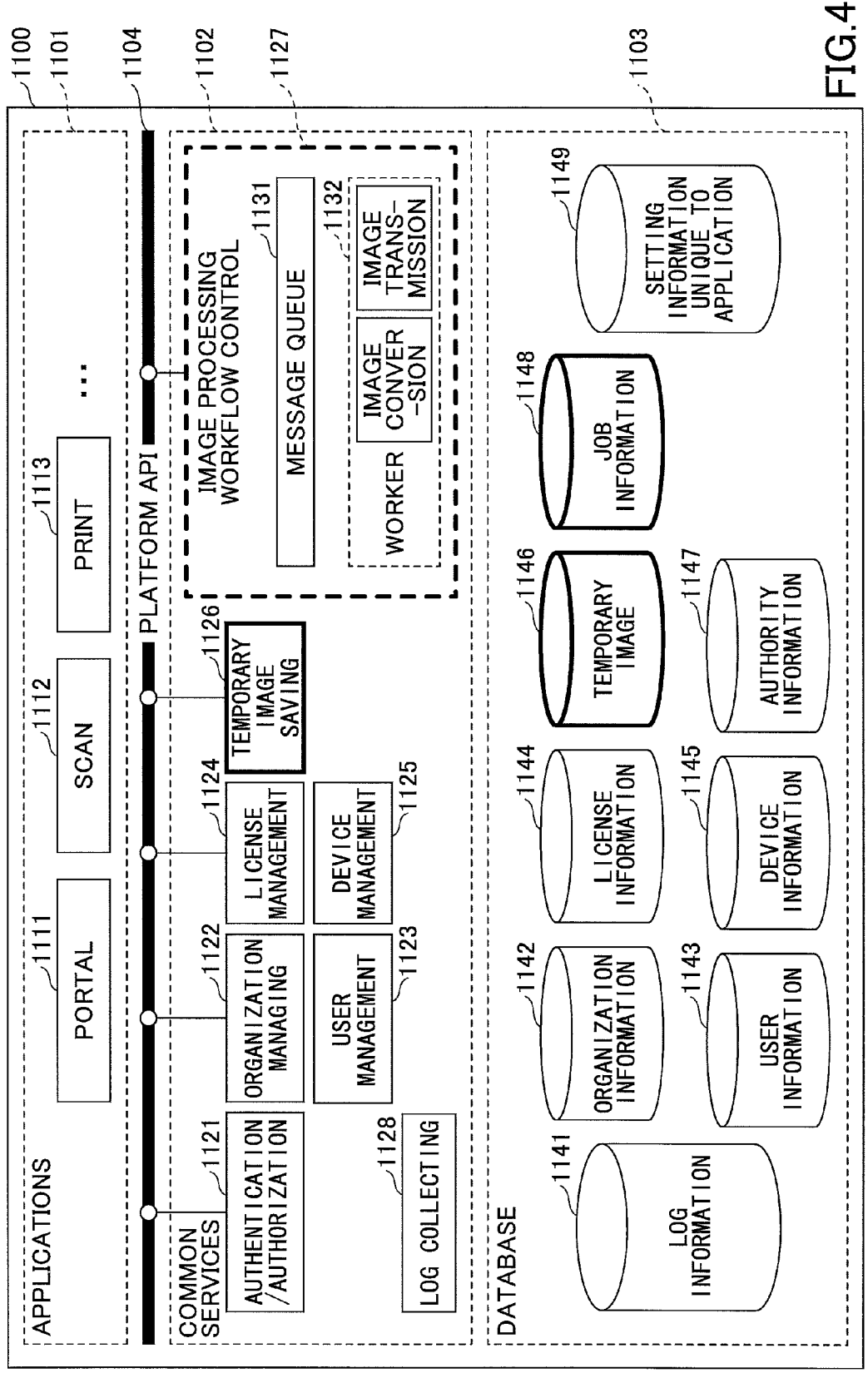
FIG. 4 is a process block diagram of an example of a service providing system according to the first embodiment.

The service providing system according to the first embodiment is realized by, for example, process blocks as illustrated in FIG. 4. FIG. 4 is a process block diagram of an example of a service providing system according to the first embodiment.

A service providing system 1100 realizes applications 1101, common services 1102, a database (DB) 1103, and a platform API (Application Programming Interface) 1104, by executing programs.

The applications 1101 include, for example, a portal service application 1111, a scan service application 1112, and a print service application 1113.

The portal service application 1111 is an application for providing a portal service. A portal service provides a service acting as an entrance for using the service providing system 1100. The scan service application 1112 is an application for providing a scan service. The print service application 1113 is an application for providing a print application. The applications 1101 may include other service applications.

The platform API 1104 is an interface for using the common services 1102 by the applications 1101, by the portal service application 1111, the scan service application 1112, and the print service application 1113. The platform API 1104 is an interface that is defined in advance, which is provided for the common services 1102 to receive requests from the applications 1101. The platform API 1104 is constituted by, for example, functions and classes.

The platform API 1104 is realized by, for example, a Web API that can be used via the network, when the service providing system 1100 is constituted by a plurality of information processing devices.

The common services 1102 include an authentication/authorization unit 1121, an organization managing unit 1122, a user management unit 1123, a license management unit 1124, a device management unit 1125, a temporary image saving unit 1126, an image processing workflow control unit 1127, and a log collecting unit 1128.

Furthermore, the image processing workflow control unit 1127 includes a message queue 1131, and at least one worker 1132. The worker 1132 realizes functions such as image conversion and image transmission.

The authentication/authorization unit 1121 executes authentication/authorization based on a log in request from office devices such as the client terminal 1011 and the image forming apparatus 1013. The office device is a collective term of the client terminal 1011, the mobile terminal 1012, and the image forming apparatus 1013.

The authentication/authorization unit 1121 authenticates/ authorizes a user by accessing, for example, a user information storage unit 1143, a license information storage unit 1144, and an authority information storage unit 1147, described below. Furthermore, the authentication/authorization unit 1121 authenticates, for example, the image forming apparatus 1013 by accessing, for example, the organization information storage unit 1142, the license information storage unit 1144, and the device information storage unit 1145, described below.

The organization managing unit 1122 manages organization information stored in an organization information storage unit 1142 described below. The user management unit 1123 manages user information stored in the user information storage unit 1143 described below. Furthermore, the user management unit 1123 manages authority information stored in the authority information storage unit 1147 described below.

The license management unit 1124 manages license information stored in the license information storage unit 1144 described below. The device management unit 1125 manages device information stored in a device information storage unit 1145 described below. The temporary image saving unit 1126 saves temporary images in a temporary image storage unit 1146 described below, and acquires temporary images from the temporary image storage unit 1146.

The image processing workflow control unit 1127 controls a workflow relevant to image processing, based on a request from the applications 1101. The message queue 1131 includes a queue corresponding to the type of process. The image processing workflow control unit 1127 submits the message of the request relevant to the process (job), in the queue corresponding to the type of the job.

The worker 1132 monitors the corresponding queue. When a message is submitted in the queue, the worker 1132 performs a process such as image conversion and image transmission according to the type of the corresponding job. Note that the submitted message may be subjectively read (pulled) by the worker 1132, or may be provided (pushed) from the queue to the worker 1132.

The database 1103 includes a log information storage unit 1141, an organization information storage unit 1142, a user information storage unit 1143, a license information storage unit 1144, a device information storage unit 1145, a temporary image storage unit 1146, an authority information storage unit 1147, a job information storage unit 1148, and a setting information storage unit 1149 unique to an application.

The log information storage unit 1141 stores log information. The organization information storage unit 1142 stores organization information described below. The user information storage unit 1143 stores user information described below. The license information storage unit 1144 stores license information described below. The device information storage unit 1145 stores device information described below.

The temporary image storage unit 1146 stores a temporary image. A temporary image is, for example, a file or data of a scan image to be processed by the worker 1132. The authority information storage unit 1147 stores authority information described below. The job information storage unit 1148 stores information (job information) of a request relevant to a process (job). The setting information storage unit 1149 unique to an application stores setting information unique to the application 1101.

The service providing system 1100 functions as an integrated base for providing a common service such as a workflow relevant to authentication/authorization and image processing, and a group of services providing application services by using the function of the integrated base, such as a scan service, a print service, and a portal service. The integrated base is constituted by, for example, the common services 1102, the database 1103, and the platform API 1104. The group of services is constituted by, for example, the applications 1101.

The service providing system 1100, illustrated in FIG. 4 can easily develop the applications 1101 using the platform API 1104, according to the configuration in which the group of services and the integrated base are separated.

Note that the classification form of the process blocks of the service providing system 1100 illustrated in FIG. 4 is one example; it is not essential that the applications 1101, the common services 1102, and the database 1103 are classified into a hierarchy as illustrated in FIG. 4. As long as the process of the service providing system 1100 according to the first embodiment can be performed, the hierarchical relationship illustrated in FIG. 4 is not limited to a particular relationship.

FIG. 5 is a configuration diagram of an example of organization information. The organization information illustrated in FIG. 5 includes, as data items, an organization ID, an organization name, a display language, the time zone, a state, and a country. The organization ID is information for identifying a group such as a company and a department. The organization ID is not limited to the word "organization"; for example, the information may be for identifying a contract. Note that the organization ID is unique.

The organization name expresses the name of a group such as a company and a department. The display language expresses the language used for expressing the name of a group such as a company and a department. The time zone expresses the standard time used by a group such as a company and a department. A state expresses the state of a group such as a company and a department. A country expresses a name of a country to which a group such as a company and a department belongs.

FIG. 6 is a configuration diagram of an example of user information. The user information illustrated in FIG. 6 includes, as data items, an organization ID, a user ID, a password, a user name, a display language, a time zone, a state, and a UUID.

The user ID and the password are information for identifying a user (user identification information). The user ID may be a user name. Furthermore, a password is not essential. Note that the user ID and password managed by the same organization ID are unique, but may be overlapping with another user ID and password if the organization ID is different.

Furthermore, as the user ID, information for identifying an electronic medium (for example, an IC card) held by the user may be used. As the electronic medium held by the user, an IC card, a mobile phone, a tablet terminal, and an electronic book terminal may be used. As the information for identifying an electronic medium, a card ID, a serial ID, a telephone number of a mobile phone, and profile information of a terminal may be used. The information for identifying an electronic medium may be used in combination.

The user name expresses the name of the user. The display language expresses the language used for displaying the user name. The time zone is the standard time used by the user. The state expresses the state of the user. The country expresses the name of the country to which the user belongs.

The UUID (Universally Unique Identifier) is a unique identifier. For example, the UUID is a unique identifier across the world; however, in the present embodiment, the UUID does not necessarily need to be unique across the world, as long as the UUID is a unique identifier in the information processing system 1000 according to the first embodiment.

FIG. 7 is a configuration diagram of an example of license information. The license information illustrated in FIG. 7 includes, as data items, an organization ID and a service. The service is information for identifying a service (service identification information). The license information expresses at least one service which can be used by an organization identified by the organization ID. The license information is created in a case where, for example, there are one or more licenses for valid services belonging to an organization.

FIG. 8 is a configuration diagram of an example of device information. The device information illustrated in FIG. 8 includes, as data items, an organization ID, device authentication information, business office information, and capability. The device authentication information is information used for device authentication, which is performed for determining whether an office device fulfills a particular condition. The device authentication information may be an ID indicating that a particular application is installed in the office device, or a device number indicating a particular office device. The business office information expresses, for example, the business office at which the office device is installed. The capability expresses, for example, the capability of the office device.

FIG. 9 is a configuration diagram of an example of authority information. The authority information illustrated in FIG. 9 includes, as data items, a user ID and a role. The role expresses the role of the user. As the role of the user, for example, an administrator and a general user are included.

Figure 10:
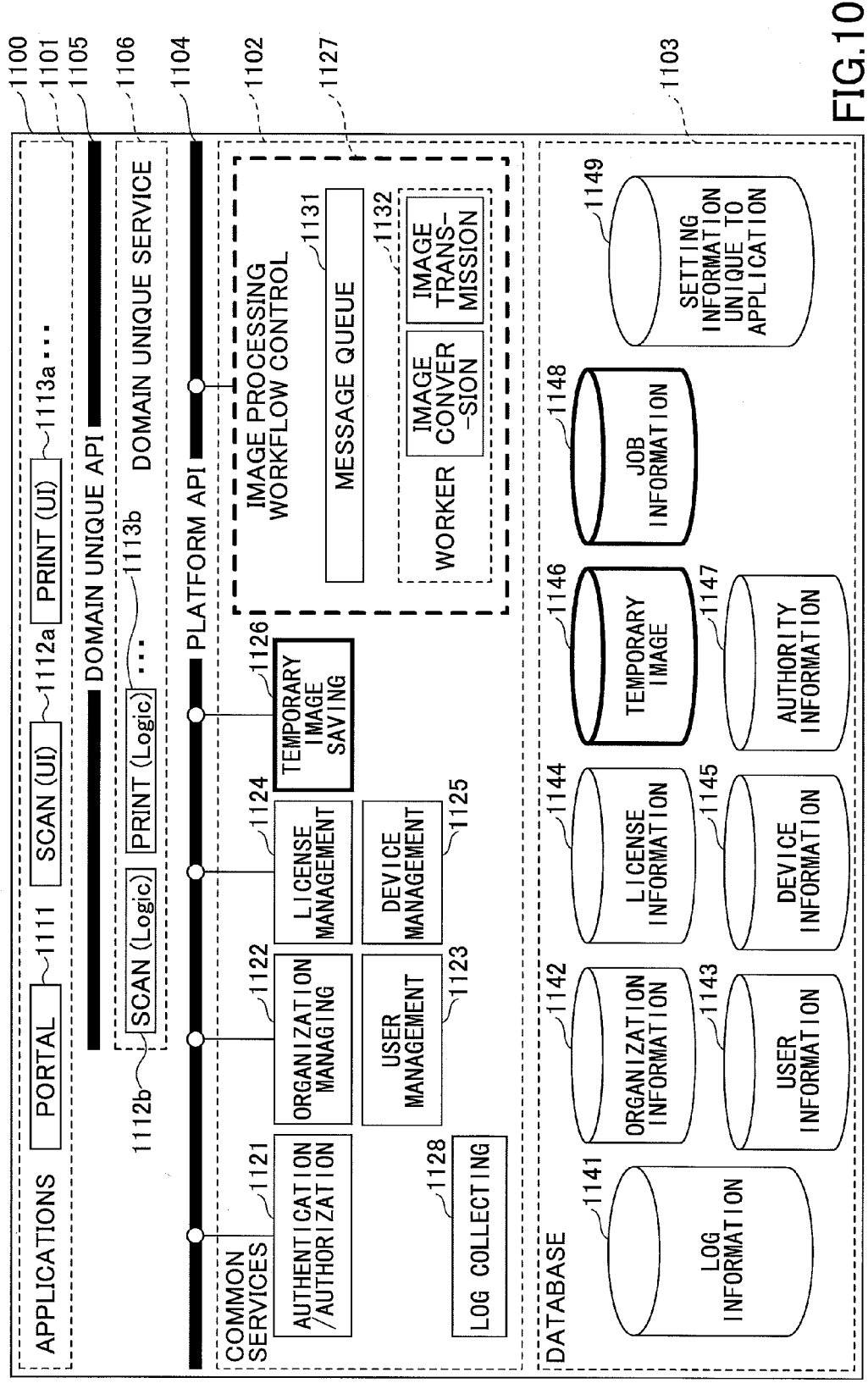
FIG. 10 is a process block diagram of another example of the service providing system according to the first embodiment.

Note that the process blocks of the service providing system 1100 illustrated in FIG. 4 may be, for example, process blocks as illustrated in FIG. 10. FIG. 10 is a process block diagram of another example of the service providing system according to the first embodiment. Note that the service providing system 1100 illustrated in FIG. 10 is the same as the service providing system 1100 illustrated in FIG. 4 except for some elements, and therefore descriptions of the same elements are omitted.

The service providing system 1100 illustrated in FIG. 10 realizes a domain unique API 1105 and a domain unique service 1106, in addition to the applications 1101, the common services 1102, the database (DB) 1103, and the platform API (Application Programming Interface) 1104, by executing programs.

The service providing system 1100 illustrated in FIG. 10 is different from the service providing system 1100 illustrated in FIG. 4, in terms of the applications 1101, the domain unique API 1105, and the domain unique service 1106. The applications 1101 illustrated in FIG. 10 include, for example, the portal service application 1111, a UI unit of a scan service application 1112a, and a UI unit of a print service application 1113a. Furthermore, the domain unique services 1106 include, for example, a logic unit of a scan application 1112b and a logic unit of a print service application 1113b.

The logic unit of a scan application 1112b and the logic unit of a print service application 1113b, which are logics unique to the domain, receive accesses from clients other than the web browser of the mobile terminal 1012 and the image forming apparatus 1013. In clients other than the web browser, UI units such as the UI unit of a scan service application 1112a are disposed on the client side, and therefore the server side only needs to provide the domain unique API 1105.

As described above, in the service providing system 1100 illustrated in FIG. 10, the UI units such as the UI unit of a scan service application 1112a receive accesses from the web browser. Furthermore, the logic units such as the logic unit of a scan application 1112b receive accesses from clients other than the web browser. Because the frequency of accesses from the web browser is different from the frequency of accesses from clients other than the web browser, the scan service application 1112a and the scan application 1112b are provided as separate servers, so as to efficiently perform the scaling out accompanying an increase in the frequency. Furthermore, in the service providing system 1100 illustrated in FIG. 10, multiple applications can be constructed by using domain unique APIs in combination.

Portal Service Application 1111

Figure 11:
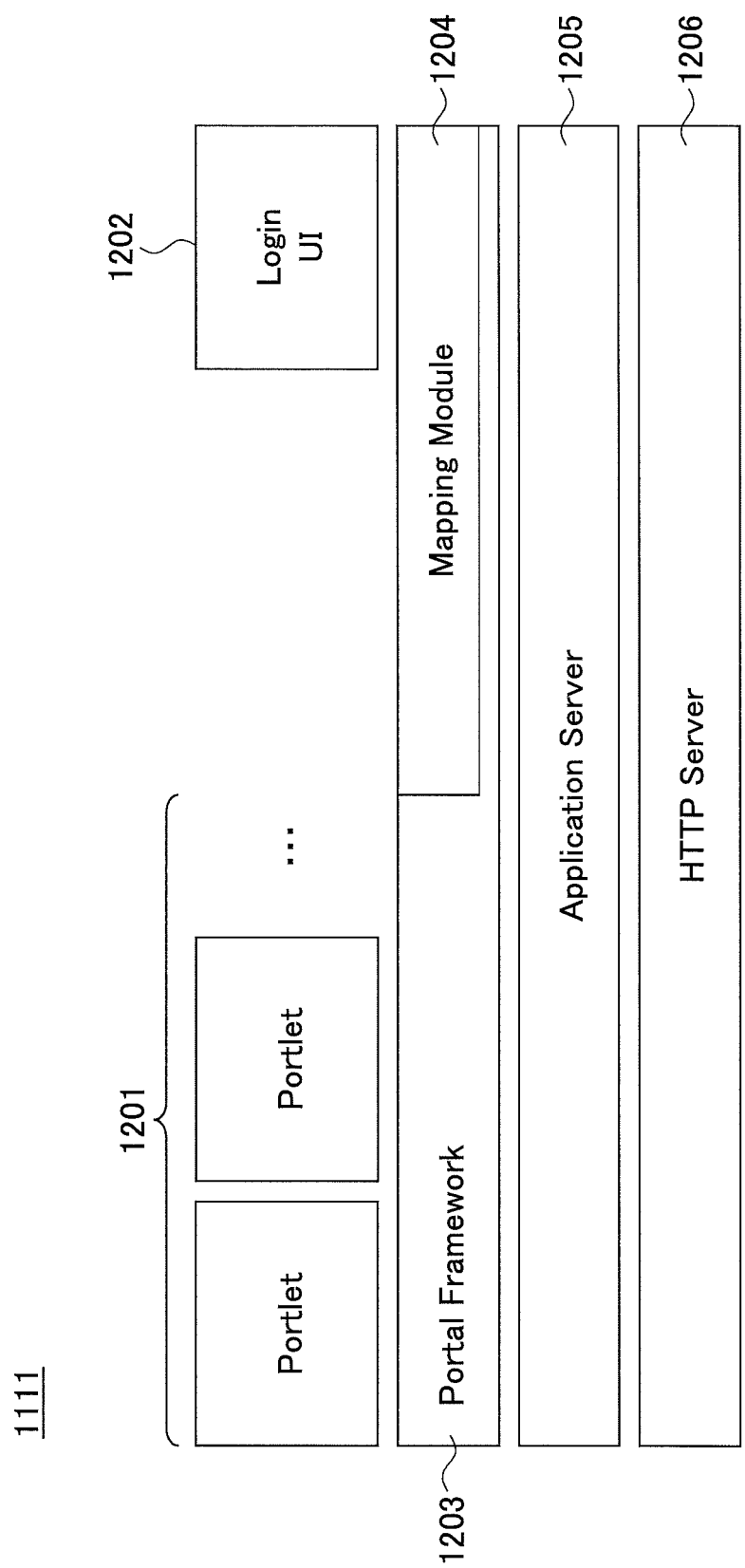
FIG. 11 is a configuration diagram of an example of a portal service application.

FIG. 11 is a configuration diagram of an example of the portal service application 1111. The portal service application 1111 includes at least one portlet 1201, a log in UI 1202, a portal framework 1203, a mapping module 1204, an application server 1205, and an HTTP server 1206.

In the portal service application 1111 illustrated in FIG. 11, the portal framework 1203 is activated on the application server 1205 and the HTTP server 1206. The portal framework 1203 includes the mapping module 1204 having functions as described below.

The portal framework 1203 collectively provides multi-purpose functions to the at least one portlet 1201 and the log in UI 1202, and functions as a base of the at least one portlet 1201 and the log in UI 1202. The at least one portlet 1201 is a removable UI component that is managed and displayed by the portal. The log in UI 1202 performs processes relevant to log in from a user operating the office device.

Details of Process

Log In

When a system for performing user management of a plurality of organizations, and a system without the concept of organizations are used in combination, and user management is performed with a user ID, there may be cases where the same user ID is present across different organizations, which may cause inconveniences in the user management.

For example, in the case of the service providing system 1100 illustrated in FIG. 4, when a portal service application 1111 without the concept of organizations is used, the same inconvenience arises. In the service providing system 1100 illustrated in FIG. 4, when user management is performed with a user ID, there may be cases where the same user ID is present across different organizations in the common services 1102 and the database 1103 corresponding to user management of a plurality of organizations.

Therefore, in the service providing system 1100 according to the first embodiment, a UUID is applied to the user identification information such as a user ID. The portal service application 1111 without the concept of organizations uses the UUID when requesting a process to the common services 1102 and the database 1103 by specifying a user. The portal service application 1111 only needs to use the UUID instead of the user ID, and therefore significant changes are unnecessary, as described below.

Figure 12:
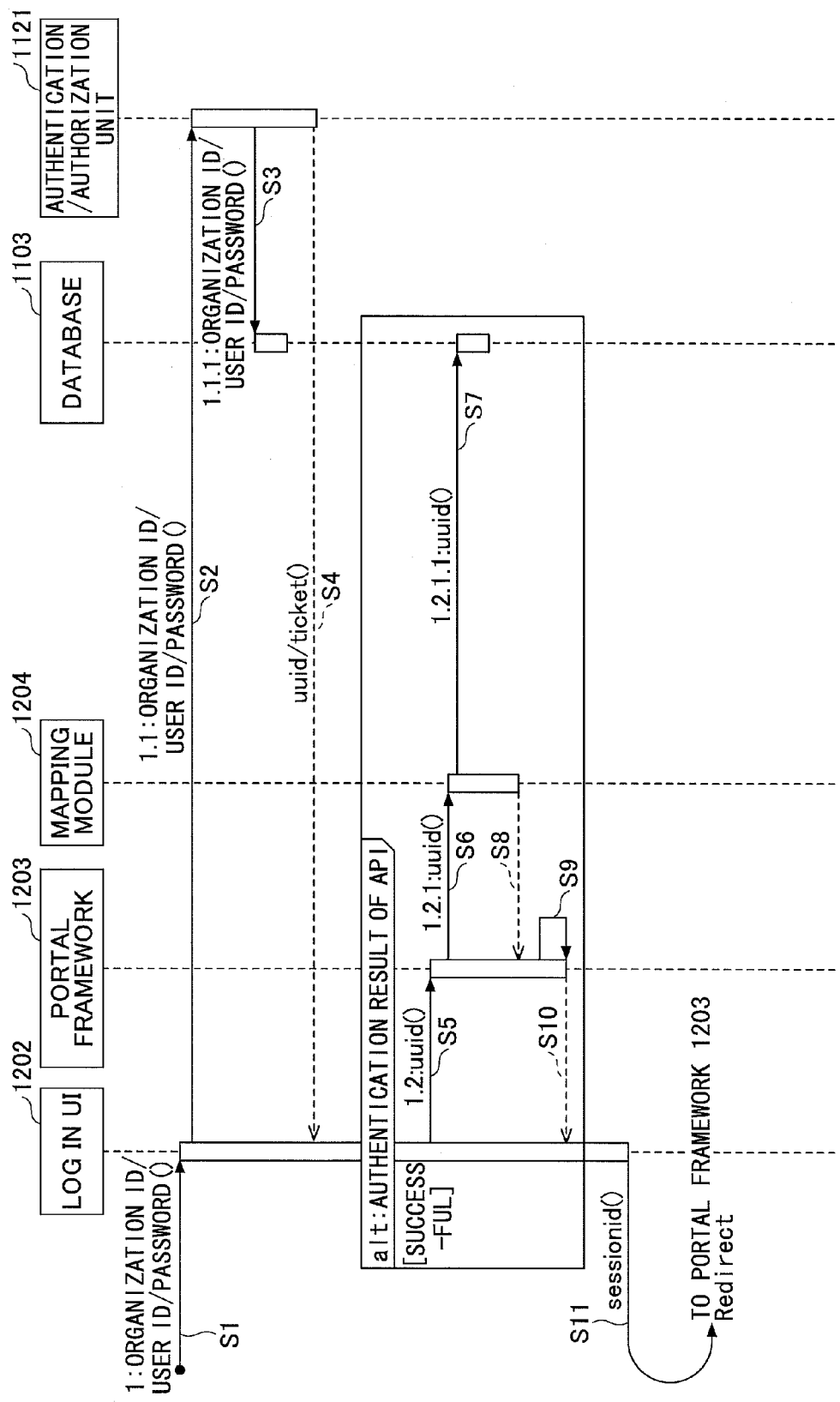

FIG. 12 is a sequence diagram (part 1 of 2) of an example of processing procedures for logging in. For example, the web browser installed in the client terminal 1011 of FIG. 1 receives, from the user, an input of a URL of a log in screen or a selection from a bookmark as the access destination, to receive the log in screen from the log in UI.

The web browser displays a log in screen. The user enters, in the log in screen, an organization ID, a user ID, and a password, and presses a log in button. When the log in button is pressed, the web browser proceeds to step S1, and requests log in to the log in UI 1202. Note that in the request for log in, an organization ID, a user ID, and a password are included.

In step S2, the log in UI 1202 requests log in to the authentication/authorization unit 1121, according to the organization ID, the user ID, and the password included in the request to log in from the web browser. The authentication/authorization unit 1121 confirms whether the combination of the organization ID, the user ID, and the password included in the request to log in from the log in UI 1202, is stored in the user information storage unit 1143 as user information as illustrated in FIG. 6 (step S3).

When the combination of the organization ID, the user ID, and the password included in the request to log in is stored in the user information storage unit 1143, in step S4, the authentication/authorization unit 1121 returns the authentication ticket to the log in UI 1202. Furthermore, in step S4, the authentication/authorization unit 1121 returns, to the log in UI 1202, the UUID associated with the combination of the organization ID, the user ID, and the password included in the request to log in.

In step S5, the log in UI 1202 specifies the UUID and requests log in to the portal framework 1203. In step S6, the portal framework 1203 specifies the UUID, and requests log in to the mapping module 1204. In step S7, the mapping module 1204 confirms whether the UUID included in the request to log in from the portal framework 1203 is stored in the user information storage unit 1143 as user information as illustrated in FIG. 6.

When the UUID included in the request to log in is stored in the user information storage unit 1143, in step S8, the mapping module 1204 returns authentication OK to the portal framework 1203. The mapping module 1204 functions as a module for connecting the portal framework 1203 and the database 1103.

Figure 13:
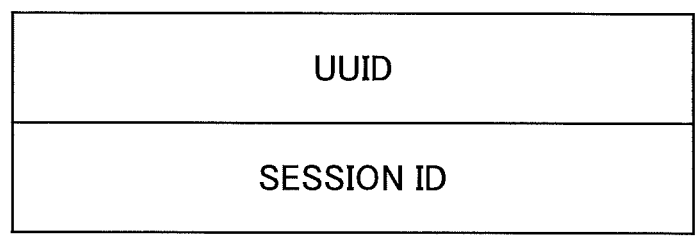
FIG. 13 is a configuration diagram of an example of a table for associating the UUID and a session ID.

In step S9, the portal framework 1203 generates a session ID, and also saves the session ID and the UUID in association with each other as illustrated in FIG. 13. FIG. 13 is a configuration diagram of an example of a table for associating the UUID and a session ID.

In step S10, the portal framework 1203 returns, to the log in UI 1202, a response to the log in request of step S5. When the authentication result is OK, in step S11, the log in UI 1202 specifies a session ID and redirects the web browser to the portal framework 1203. Note that the session ID can be set in the cookie.

Figure 14:
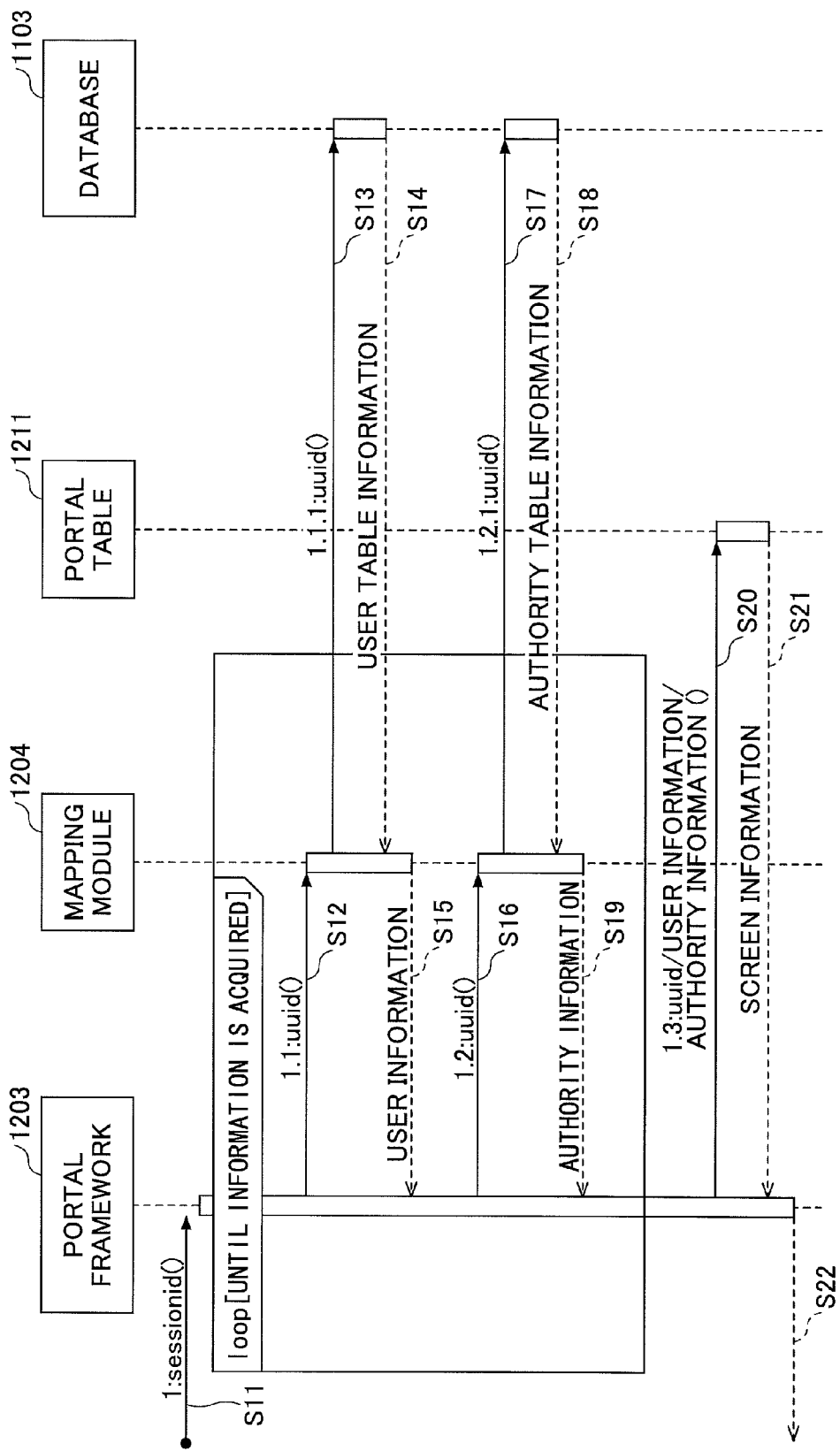

The process of step S11 and onward is illustrated in FIG. 14. FIG. 14 is a sequence diagram (part 2 of 2) of an example of processing procedures for logging in. The portal framework 1203 acquires the session ID set in the cookie, and reads a UUID associated with the session ID from the table illustrated in FIG. 13. Based on the UUID, the portal framework 1203 repeatedly requests the mapping module 1204 to provide information, until the information necessary for creating a portal screen can be acquired.

For example, in step S12, the portal framework 1203 specifies a UUID, and requests the mapping module 1204 to provide user table information. In step S13, the mapping module 1204 requests the database 1103 to provide user table information specified by the UUID. In step S14, the mapping module 1204 acquires the user table information from the database 1103.

The mapping module 1204 converts the user table information acquired from the database 1103, into a data structure that can be handled at the portal framework 1203. Then, in step S15, the mapping module 1204 provides the user information having the data structure that can be handled at the portal framework 1203, to the portal framework 1203.

Similar to steps S12 through S15, for example, in step S16, the portal framework 1203 specifies the UUID, and requests the mapping module 1204 to provide authority table information. In step S17, the mapping module 1204 requests the database 1103 to provide the authority table information specified by the UUID. In step S18, the mapping module 1204 acquires the authority table information from the database 1103.

The mapping module 1204 converts the authority table information acquired from the database 1103 into a data structure that can be handled at the portal framework 1203.

Then, in step S19, the mapping module 1204 provides the authority information having the data structure that can be handled at the portal framework 1203, to the portal framework 1203.

Note that the user table information illustrated in FIG. 14 is one example of the user information necessary for creating the portal screen. Furthermore, the authority table information is an example of authority information necessary for creating a portal screen. The contents of the information acquired by the mapping module 1204 from the database 1103 and the procedures for acquiring the information illustrated in FIG. 14 are one example; the contents and procedures may be as described below.

For example, in the case of information having configurations as illustrated in FIGS. 5 through 9, the mapping module 1204 may specify the UUID and acquire information illustrated in FIG. 6, and specify the organization ID of the acquired user information and acquire the organization information of FIG. 5, the license information of FIG. 7, and the device information of FIG. 8. Furthermore, the mapping module 1204 may specify the user ID of the acquired user information and acquire the authority information illustrated in FIG. 9.

When the information necessary for creating a portal screen is acquired, as illustrated in FIG. 15, the portal framework 1203 caches the information in association with the UUID. FIG. 15 is a configuration diagram of an example of the cache data. The cache data illustrated in FIG. 15 is for storing the information acquired from the database 1103, in association with the UUID. The cache data is cached in a storage area that can be accessed at high speed from the portal framework 1203. Note that information for which a change needs to be immediately applied, such as authority information, may not be cached.

For example, the setting as to whether the information is "to be cached or not to be cached" may be collectively set for all information items, or may be set for each information item. In step S20, the portal framework 1203 specifies a UUID, user information, authority information, etc., and requests a portal table 1211 to provide screen information for a portal screen.

The portal table 1211 is a table including screen information. FIG. 16 is a configuration diagram of an example of a portal table 1211. As illustrated in FIG. 16, the portal screen includes a common screen provided to all portal users, and a service exclusive-use screen provided to a user having the usage authority to use each service.

In the portal table 1211 illustrated in FIG. 16, for each role of the user, a "◯" mark is indicated for the tab to be displayed among the tables included in the common screen, and a "◯" mark is indicated for the tab to be displayed among the tabs included in the service exclusive-use screen.

In step S21, the portal framework 1203 acquires, from the portal table 1211, the screen information of the portal screen based on the role of the user and the service for which the user has a usage authority. In step S22, the portal framework 1203 generates a portal screen based on the screen information of the acquired portal screen, and displays the portal screen on the web browser.

For example, in the case of the portal table 1211 as illustrated in FIG. 16, in a portal screen of a user who has a role "user" and a usage authority for the services "scan service" and "print service", the tabs of "application list", "account information", and "job registration screen" are displayed.

Furthermore, in the case of the portal table 1211 as illustrated in FIG. 16, in a portal screen of a user who has a role "poweruser" and a usage authority for the services "scan service" and "print service", all of the tabs are displayed.

Note that when the UUID acquired from the cookie is cached in the cache data illustrated in FIG. 15, the portal framework 1203 may use the cached information without requesting the mapping module 1204 to provide information. By using the cache data, the portal framework 1203 can reduce the frequency of accessing the database 1103, and can reduce the time until the portal screen is displayed.

Overview

By the service providing system 1100 according to the first embodiment, even when the portal framework 1203 does not use an organization ID, the user can be identified with a UUID. Thus, it is easy to cooperate with the common services 1102 and the database 1103 that use an organization ID.

Therefore, by using the UUID, the information processing system 1000 according to the first embodiment can cancel out the difference in the user information for user management, and therefore the degree of freedom in the user information for user management can be increased.

According to one embodiment of the present invention, an information processing system, an information processing device, and an authentication method are provided, which are capable of increasing the degree of freedom in user information for user management.

The image processing system, the image processing device, and the authentication method are not limited to the specific embodiments described herein, and variations and modifications may be made without departing from the spirit and scope of the present invention. For example, in the present embodiment, a description is given of the portal service application 1111 as one example; however, an embodiment of the present invention is also applicable to the scan service application 1112 and the print service application 1113.

Note that the common service 1102 corresponds to a common service providing unit. The application 1101 corresponds to an application service providing unit. The log in UI 1202 corresponds to a receiving unit. The portal framework 1203 corresponds to a requesting unit. The UUID corresponds to unique identification information. The office device in which the web browser is installed corresponds to an external device. The mapping module 1204 corresponds to a connection unit. The user ID corresponds to user identification information. The organization ID corresponds to organization identification information.

The present application is based on and claims the benefit of priority of Japanese Priority Patent Application No. 2013-021266, filed on Feb. 6, 2013, the entire contents of which are hereby incorporated herein by reference.

What is claimed is:

1. An information processing system including one or more information processing devices, the information processing system comprising:
a common service providing unit configured to manage a user with organization identification information, user identification information, and unique identification information, and to provide a common service; and
an application service providing unit configured to manage a user with user identification information, and to provide an application service by using the common service provided by the common service providing unit, wherein
the application service providing unit includes
a receiving unit configured to request the common service providing unit to perform authentication on user identification information and organization identification information received from an external device, and receive, from the common service providing unit, the unique identification information associated with the user identification information and the organization identification information received from the external device, and
a requesting unit configured to identify a user with the unique identification information, and request the common service providing unit to provide the common service.

2. The information processing system according to claim 1, wherein
the requesting unit identifies the user with the unique identification information and requests the common service providing unit to provide information, and stores the information acquired by the request in association with the unique identification information.

3. The information processing system according to claim 2, wherein
when there is the information that is stored in association with the unique identification information when the requesting unit identifies the user with the unique identification information and requests the common service providing unit to provide the information, the requesting unit uses the information that is stored in association with the unique identification information without requesting the common service providing unit to provide the information.

4. The information processing system according to claim 1, wherein
the requesting unit identifies the user with the unique identification information, and causes the common service providing unit to
acquire at least authority information of the user associated with the unique identification information and application service information expressing the application service that can be used by the user,
generate a screen according to the authority information and the application service information that have been acquired, and
display the screen on the external device.

5. The information processing system according to claim 1, wherein
the application service providing unit further includes
a connection unit configured to make the request, which has been made by the requesting unit by identifying the user with the unique identification information, to the common service providing unit.

6. The information processing system according to claim 5, wherein
when the requesting unit identifies the user with the unique identification information and requests the common service providing unit to provide information, the connection unit converts the information acquired by the request into a data structure that can be handled at the requesting unit.

7. An information processing device comprising:
a common service providing unit configured to manage a user with organization identification information, user identification information, and unique identification information, and to provide a common service; and
an application service providing unit configured to manage a user with user identification information, and to provide an application service by using the common service provided by the common service providing unit, wherein
the application service providing unit includes
a receiving unit configured to request the common service providing unit to perform authentication on user identification information and organization identification information received from an external device, and receive, from the common service providing unit, the unique identification information associated with the user identification information and the organization identification information received from the external device, and a requesting unit configured to identify a user with the unique identification information and request the common service providing unit to provide the common service.

8. An authentication method executed by an information processing system including one or more information processing devices, wherein the information processing system includes a common service providing unit configured to manage a user with organization identification information, user identification information, and unique identification information, and to provide a common service, and an application service providing unit configured to manage a user with user identification information, and to provide an application service by using the common service provided by the common service providing unit, the authentication method comprising:

requesting, by the application service providing unit, the common service providing unit to perform authentication on user identification information and organization identification information received from an external device;

receiving, by the application service providing unit from the common service providing unit, the unique identification information associated with the user identification information and the organization identification information received from the external device; and requesting, by the application service providing unit, the common service providing unit to provide the common service by identifying a user with the unique identification information.

* * * * *